(12) United States Patent
Andersen et al.

(10) Patent No.: US 8,676,019 B2
(45) Date of Patent: Mar. 18, 2014

(54) OPTICAL FIBER MODULES ENCAPSULATED BY FLAME RETARDANT SILICONE

(75) Inventors: Michael N Andersen, Copenhagen (DK); Peter Haslov, Solrod Strand (DK)

(73) Assignee: OFS Fitel, LLC, Norcross, CA (US)

( * ) Notice: Subject to any disclaimer, the term of this patent is extended or adjusted under 35 U.S.C. 154(b) by 125 days.

(21) Appl. No.: 13/344,102

(22) Filed: Jan. 5, 2012

(65) Prior Publication Data
US 2013/0016950 A1 Jan. 17, 2013

Related U.S. Application Data

(60) Provisional application No. 61/507,373, filed on Jul. 13, 2011.

(51) Int. Cl.
*G02B 6/26* (2006.01)
*G02B 6/00* (2006.01)
(52) U.S. Cl.
USPC ............... 385/134; 385/27; 385/32; 385/135; 385/136; 385/137
(58) Field of Classification Search
USPC ................... 385/15, 24, 27, 31, 32, 123–128, 385/134–137
See application file for complete search history.

(56) References Cited

U.S. PATENT DOCUMENTS

| 6,334,020 | B1 * | 12/2001 | Fujimori et al. | 385/134 |
|---|---|---|---|---|
| 6,456,773 | B1 | 9/2002 | Keys | |
| 6,996,322 | B2 | 2/2006 | Bennett et al. | |
| 7,542,647 | B2 | 6/2009 | Ohtsu et al. | |
| 2003/0068504 | A1 * | 4/2003 | Joseph | 428/447 |
| 2003/0133679 | A1 | 7/2003 | Murphy et al. | |
| 2004/0005130 | A1 * | 1/2004 | Yamamoto et al. | 385/123 |
| 2010/0151221 | A1 * | 6/2010 | Horisawa et al. | 428/220 |

* cited by examiner

*Primary Examiner* — Uyen Chau N Le
*Assistant Examiner* — Michael Mooney

(57) ABSTRACT

Certain embodiments of the invention may include an optical fiber modules encapsulated by flame retardant encapsulant. According to an example embodiment of the invention, an optical fiber module is provided. The optical fiber module comprises an optical fiber shaped to form one or more loops within the module, and a flame retardant encapsulant covering any exposed portion of the optical fiber. The flame retardant encapsulant is rated UL94 V-1 or better. The loop portion of the optical fiber may be affixed permanently within the module and any exposed surface of the fiber is coated with the encapsulant.

7 Claims, 6 Drawing Sheets

OPTICAL FIBER MODULES ENCAPSULATED BY FLAME RETARDANT SILICONE

CROSS REFERENCE TO RELATED APPLICATIONS

This application claims the benefit of U.S. provisional patent application Ser. No. 61/507,373, filed Jul. 13, 2011, having the title "Optical Fiber Modules Encapsulated by Flame Retardant Silicone," which is incorporated herein by reference in its entirety.

TECHNICAL FIELD

This invention generally relates to optical fiber modules, in particular to dispersion slope compensating module (DSCM).

BACKGROUND OF THE INVENTION

For fire safety purpose, many optical fiber modules are subjected to various fire safety standards. For example, dispersion slope compensating modules (DSCM) are required to include fire resistant materials rated V-1 or better as determined by Underwriters Laboratories Standard 94 (UL94). However, common fiber coatings do not satisfy the requirement. On the contrary, most commonly used primary and secondary coatings for optical fibers burn rapidly.

The traditional way to satisfy this fire safety requirement has been to encapsulate the dispersion compensating fiber into a package made by steel or aluminum to make a DSCM. Examples of such DSCMs are disclosed in U.S. Pat. No. 6,456,773 and U.S. Pat. No. 6,996,322. Many manufacturers encapsulated the dispersion compensating fiber in a DSCM with a steel or aluminum package to pass a required fire spread test(s). One example of such test is called Equipment Assembly Fire Spread Test. This test is in accordance with Telcordia GR-63-CORE, Sec. 5.2. It characterizes the fire propagation hazard, and demonstrates that fire from an equipment assembly does not spread beyond the structural elements of the equipment under the test. Such test is performed to make sure that the DSCM would neither burn nor add fuel to an ongoing fire in, for example, a central office rack.

However, the metal cover on a DSCM adds additional process steps in production and increase the product cost. Therefore, there is a need for an optical fiber module, which satisfies required fire safety test(s) without the need of a metal cover.

BRIEF SUMMARY OF THE INVENTION

Therefore, an objective of the present invention is to provide an optical fiber module which satisfies required fire safety test(s) without a conventional metal cover on the module. According to one embodiment of the present invention, an inventive optical fiber module is provided. The optical fiber module includes an optical fiber shaped to form plurality of loops, and a flame retardant encapsulant covering the loop portion of the optical fiber. The loop portion of the optical fiber is permanently fixed, and any exposed surface of the loop portion of the optical fiber is covered with the flame retardant encapsulant.

BRIEF DESCRIPTION OF THE DRAWINGS

Reference will now be made to the accompanying figures and flow diagrams, which are not necessarily drawn to scale, and wherein.

DETAILED DESCRIPTION

Figure 1:
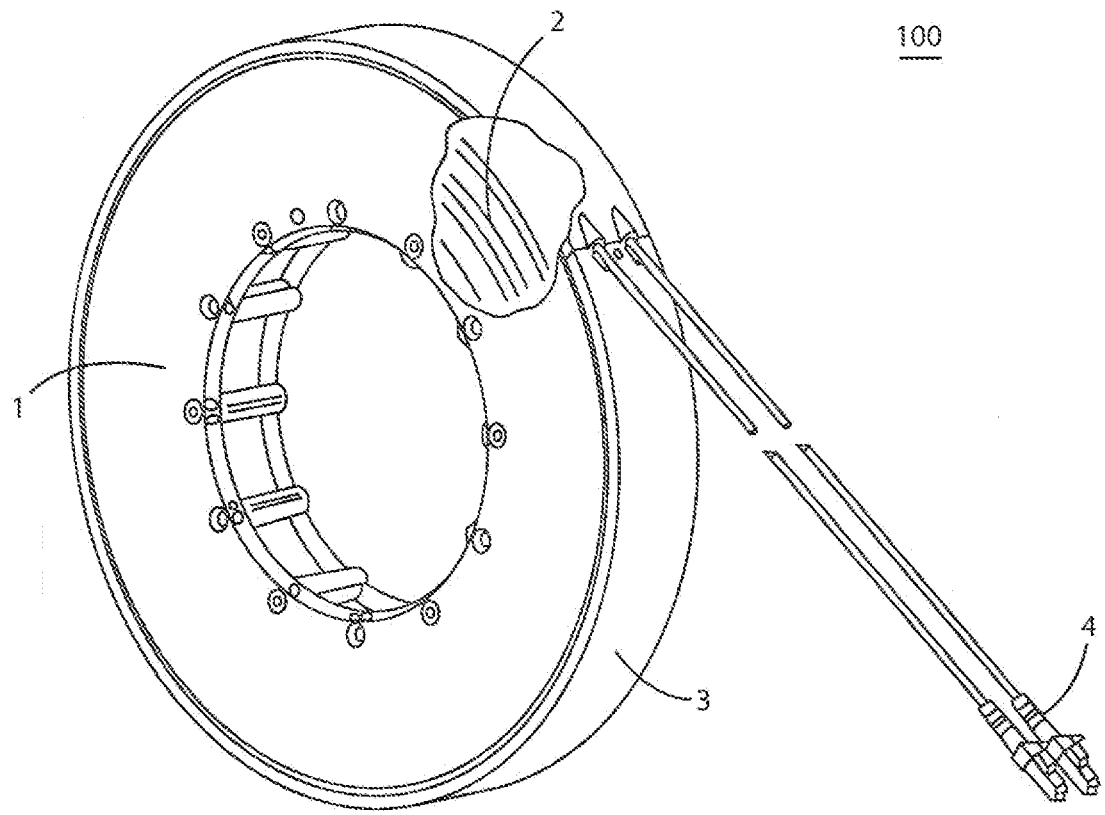
FIG. 1 is a diagram of an illustrative dispersion slope compensating modules (DSCM) of the prior art.

In the following description, similar components are referred to by the same reference numeral to enhance the understanding of the invention through the description of the drawings. Also, unless otherwise explicitly specified herein, the drawings are not drawn to scale.

Although specific features, configurations and arrangements are discussed herein below, it should be understood that such is done for illustrative purposes only. A person skilled in the relevant art will recognize that other steps, configurations and arrangements are useful without departing from the spirit and scope of the invention.

Figure 2:
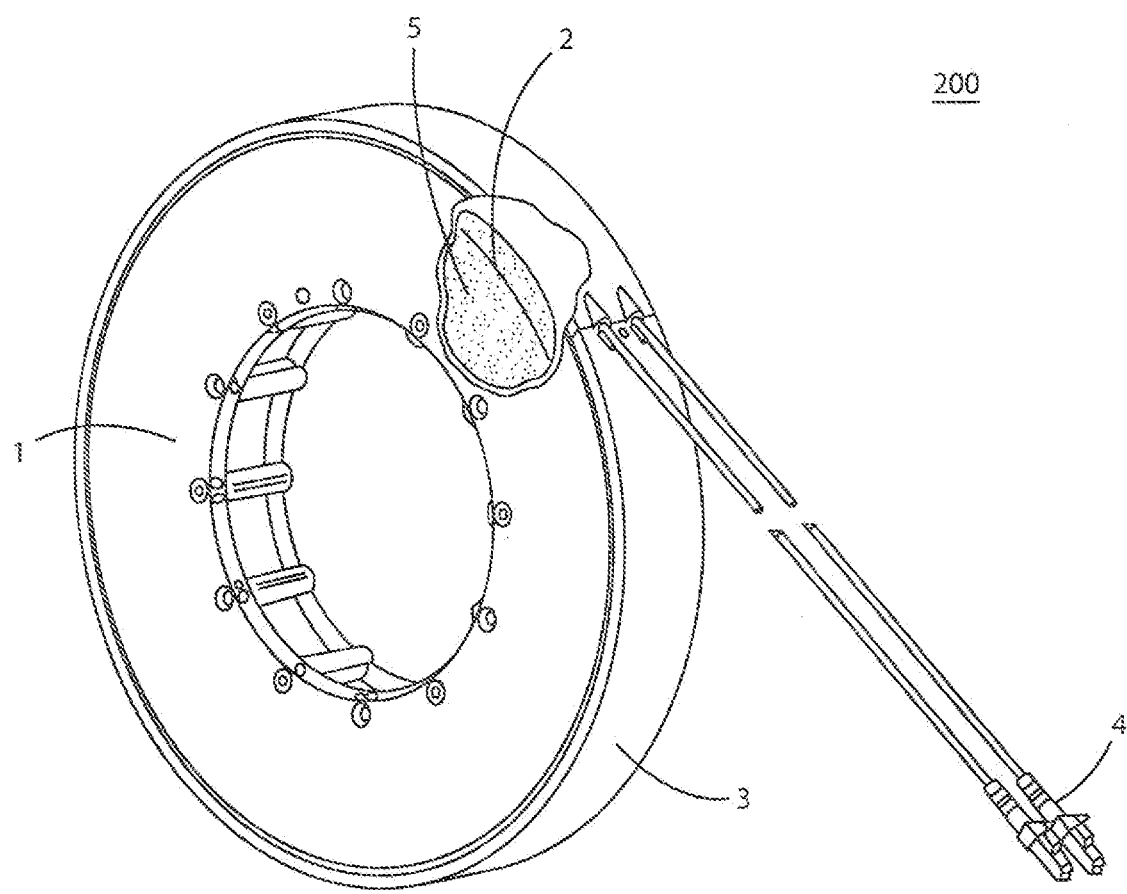
FIG. 2 is a diagram of another DSCM of the prior art.

Referring to FIG. 1, a dispersion slope compensating module (DSCM) 100 of the prior art is shown. The DSCM 100 includes a spool 1, an optical fiber 2 surrounding the spool 1, a metal cover 3 surrounding the DSCM 100, and pigtails 4 at the ends of the optical fiber 2. Referring to FIG. 2, another DSCM 200 of the prior art is shown. The DSCM 200 includes a spool 1, an optical fiber 2 surrounding the spool 1, a layer of silicone 5 surrounding the optical fiber 2, a metal cover 3 surrounding the DSCM 200, and pigtails 4 at the ends of the optical fiber 2. The optical fiber 2 on the spool 1 underneath the metal cover 3 is covered by the layer of silicone 5 in order to mechanically ensure the outermost layers of the optical fiber 2. The layer of silicone 5 is a non-flame retardant coating. In FIG. 2, the outermost surface of the optical fiber 2 on the DSCM 200 is fully covered by the layer of silicone 5. However, in some DSCMs, the fibers are secured only by a few bands of silicone, and therefore, the fibers are not fully covered by a layer of silicone. The acrylate primary and secondary coatings used in typical optical fibers burn rapidly. The metallic cover 3 has no other purpose other than fire protection.

Figure 3:
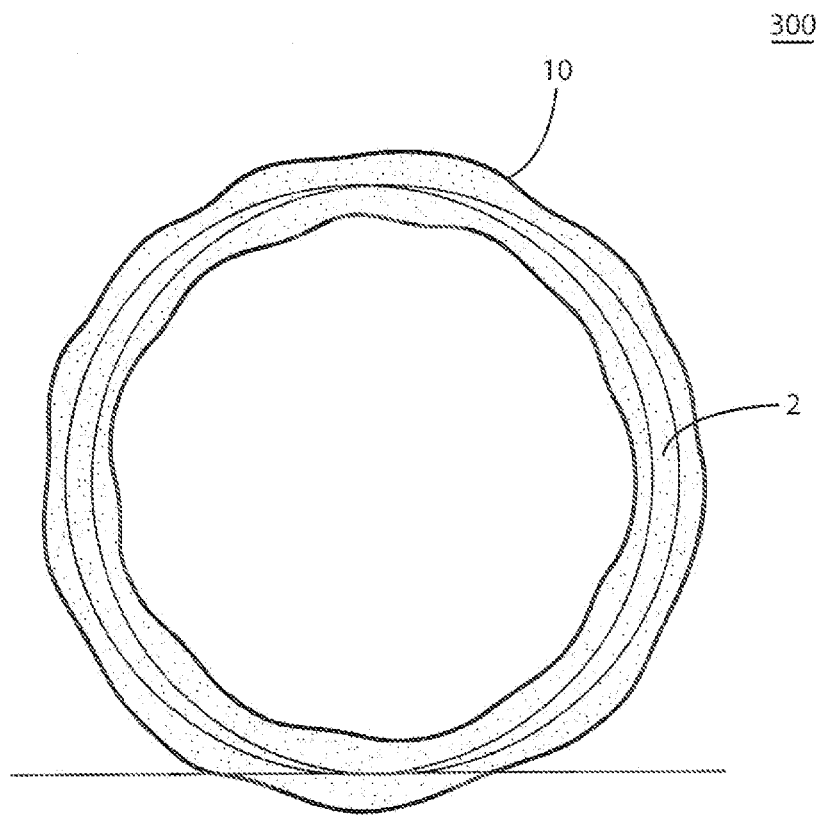
FIG. 3 is a diagram of an illustrative optical fiber module according to an example embodiment of the present invention.

To overcome one or more issues stated above, a fiber in an optical fiber module is protected by a layer of flame retardant silicone. Referring to FIG. 3, a diagram of an illustrative optical fiber module 300 according to an embodiment of the present invention is shown. The optical fiber module 300 includes an optical fiber 2 shaped to form plurality of loops, and a flame retardant encapsulant 10 covers the loop portion of the optical fiber 2.

Any exposed surface of the loop portion of the optical fiber 2 is covered with the flame retardant encapsulant 10. In this specification, exposed surface means any surface that is in contact with ambient air. The thickness of the encapsulant once applied is at least approximately 0.5 mm. Furthermore, the encapsulant is rated UL94 V-0 at any thickness between approximately 0.5 mm and approximately 5 mm.

The optical fiber 2 is any optical fiber appropriate for the particular optical fiber module 300. For example, for a DSCM, the optical fiber 2 is a dispersion compensating fiber (DCF) or a dispersion slope compensating fiber (DSCF). For a fiber laser or an amplifier, the optical fiber 2 is a doped fiber.

The loop portion of the optical fiber 2 is a shape produced by one or more curves that bend around and crosses itself. The loop portion does not have to be circular. It can be any shape produced by one or more curves as long as the optical fiber 2 crosses itself. Also, one loop portion does not have to be the same shape or the same size with other loops if a plurality of loop portions exists within the module.

In addition, the loop portion of the optical fiber 2 is permanently fixed. In this specification, permanent (or permanently) means a significant portion of an optical fiber does not have to be un-looped from its module for its application once the module is manufactured. For example, a loop section of a fiber in a DSCM is permanently fixed because the optical fiber on a spool (which is the loop section) within the DSCM does not have to be unspooled for its application. Similarly, a loop section of a fiber in a fiber laser or an amplifier is permanently fixed because the optical fiber at a cavity (which is the loop section) of the fiber laser or amplifier does not have to be unwound for its application. The cavity portion is usually placed on a metal plate for thermal management.

The flame retardant encapsulant 10, which covers the loop portion of the optical fiber 2 is, for example, rated UL94 V-1 or better. Requirements for the flame retardant encapsulant 10 may depend on the application of the optical fiber module 300. According to Telcordia GR-63-CORE, DSCMs are required to be built of fire resistant materials rated V-1 or better as determined by UL94. According to the Underwriters Laboratories Standard, UL94 V-0 is better rating than UL94 V-1.

The level of fire resistance of a material is determined by applying a blue 20 mm high flame to the center of the lower edge of a specimen of the material for 10 seconds under a condition specified by the Underwriters Laboratories Standard. If burning ceases within 30 seconds, the flame is re-applied for an additional 10 seconds. If the specimen drips, particles are allowed to fall onto a layer of dry absorbent surgical cotton placed 300 mm below the specimen.

The specimen is rated UL94 V-1 if the specimens do not burn with flaming combustion for more than 30 seconds after either application of the test flame, the total flaming combustion time may not exceed 250 seconds for the 10 flame applications for each set of 5 specimens, the specimens may not burn with flaming or glowing combustion up to the holding clamp, the specimens may not drip flaming particles that ignite the dry absorbent surgical cotton located 300 mm below the test specimen, and the specimens may not have glowing combustion that persists for more than 60 seconds after the second removal of the test flame.

The specimen is rated UL94 V-0 if the specimens do not burn with flaming combustion for more than 10 seconds after either application of the test flame, the total flaming combustion time may not exceed 50 seconds for the 10 flame applications for each set of 5 specimens, the specimens may not burn with flaming or glowing combustion up to the holding clamp, the specimens may not drip flaming particles that ignite the dry absorbent surgical cotton located 300 mm below the test specimen, and the specimens may not have glowing combustion that persists for more than 30 seconds after the second removal of the test flame.

For DSCMs, a suitable flame retardant encapsulant applied to the exposed surface of the fiber loops is 2-component RTV Silicone Elastomer type. Other suitable encapsulants include, for example, an HTV, and a 1-component silicone. The flame retardant encapsulant may be a liquid, semi-liquid, solid, or powder.

The flame retardant encapsulant is applied to at least the exposed surface of the loop portion of the fiber within the optical module. Prior methods including jacketing the fiber itself with a flame retardant tight buffer coating, and applying a flame retardant silicone around the outer surface of an optical fiber cable. However, neither of these two methods allow for the fiber to be used in a DSCM module. In the present invention, any exposed surface of the fiber within the optical module needs to be protected by an appropriate flame retardant encapsulant.

The thickness of the encapsulant once applied is at least approximately 0.5 mm. Furthermore, the encapsulant is rated UL94 V-0 at any thickness between approximately 0.5 mm and approximately 5 mm.

Figure 4:
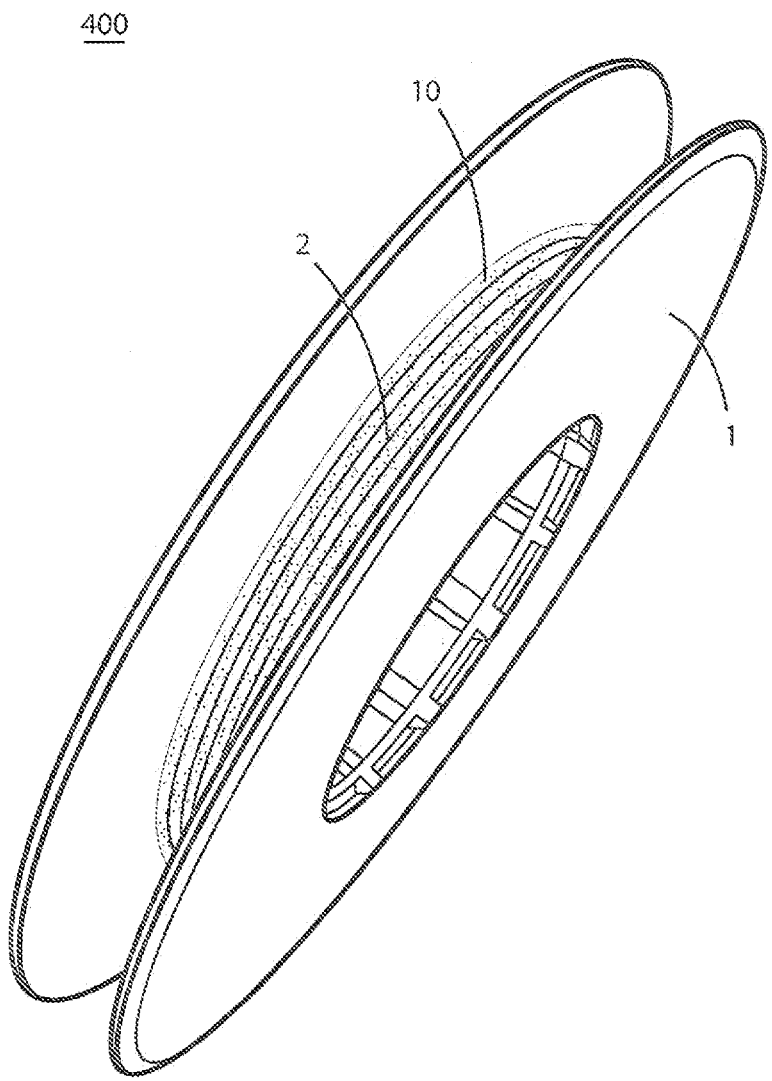
FIG. 4 is a diagram of an illustrative DSCM according to an example embodiment of the present invention.

For example, FIG. 4 shows a diagram of an illustrative DSCM 400 according to an example embodiment of the present invention. The DSCM 400 includes a spool 1, an optical fiber 2 wound around the spool 1 and a flame retardant encapsulant 10, which is applied to exposed surface of the loop portion of the optical fiber 2 within the DSCM 400. Contrary to the DSCM of the prior art shown in FIGS. 1 and 2, a metal plate surrounding the DSCM is removed because of the superior flame resistance of the flame retardant encapsulant. Because the inventive DSCM does not require a metal plate surrounding the DSCM, elimination of such metal plate on a DSCM removes additional process steps in production and reduces the product cost.

Figure 5:
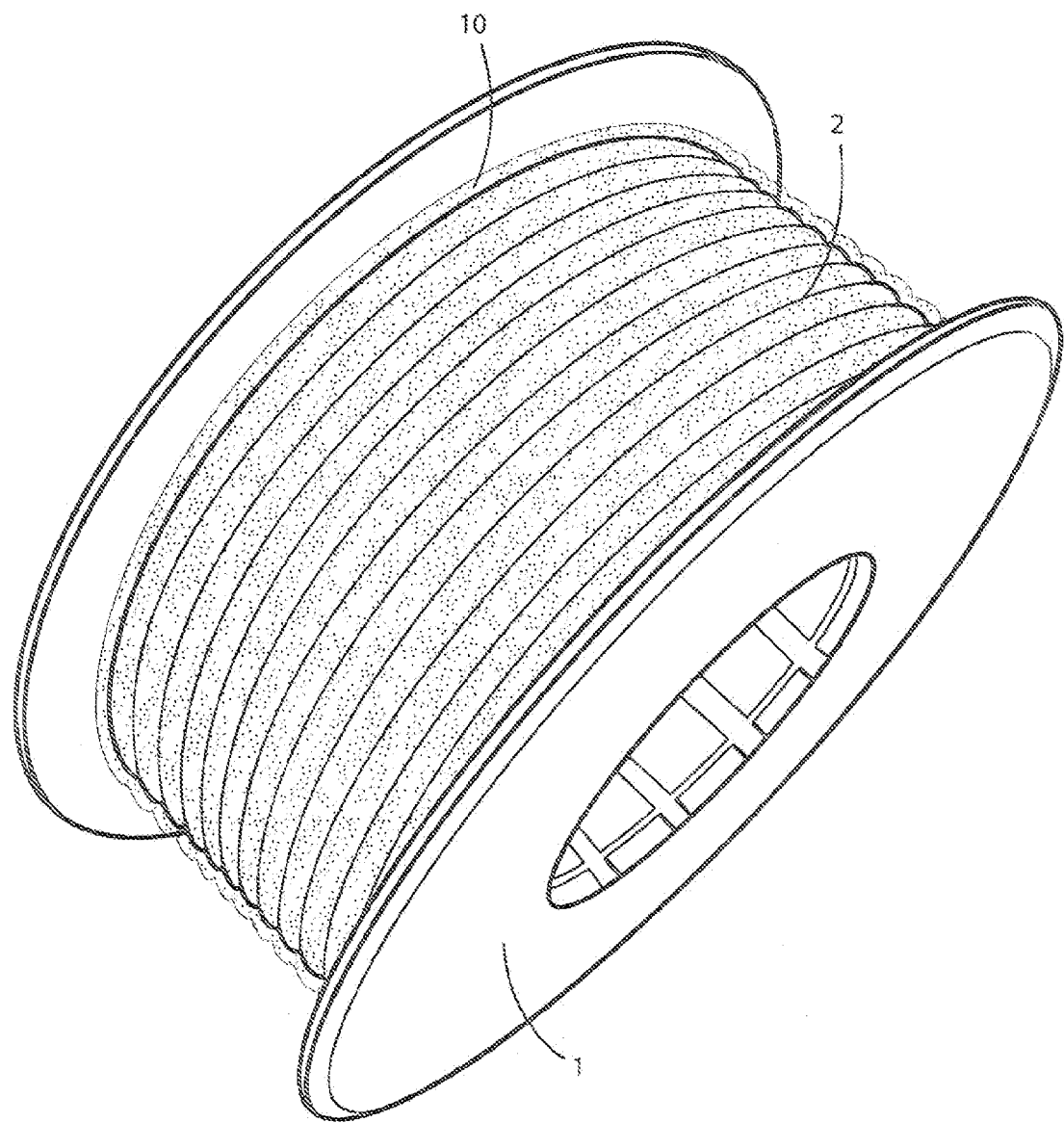
FIG. 5 is a diagram of another illustrative DSCM according to an example embodiment of the present invention.
Figure 6:
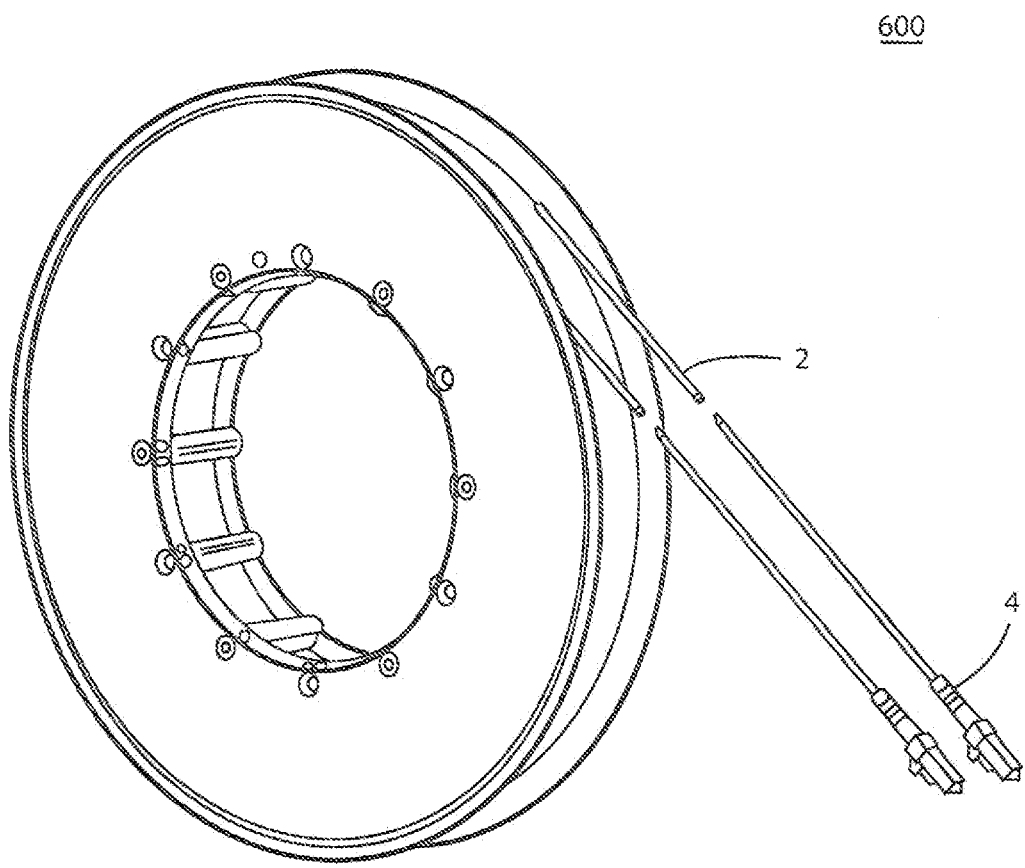
FIG. 6 is a diagram of another illustrative DSCM according to an example embodiment of the present invention.

FIG. 5 shows a diagram of another illustrative DSCM 500 according to an example embodiment of the present invention. The DSCM 500 includes a spool 1, an optical fiber 2 wound around the spool 1 and a flame retardant encapsulant 10, which is applied to exposed surface of the loop portion of the optical fiber 2 within the DSCM 500. The DSCM 500 is wider than the DSCM 400 shown in FIG. 4. However, the flame retardant encapsulant 10 works equally well on the wider exposed surface of the looped portion of the optical fiber 2. Similar to the DSCMs of the prior art, the fiber 2 of the inventive DSCM 600 can be pigtails 4 at the ends of the optical fiber 2 as shown in FIG. 6.

By using UL94 V-1 or better encapsulant on the fiber in the DSCM, the metal covers can be removed. Therefore, the inventive DSCM simplifies the manufacturing process, saves space, and reduces the cost. Also, the inventive DSCMs can be mounted to existing line cards directly without any modification.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A dispersion compensating module (DCM) comprising:
a spool;
dispersion compensating optical fiber (DCF) wound onto the spool to create a plurality of loops; and
a flame retardant encapsulant covering the loop portion of the DCF;
wherein the loop portion of the DCF is permanently fixed, and any exposed surface of the loop portion of the DCF is covered with the flame retardant encapsulant.

2. The DCM of claim 1, wherein the loop portion of the DCF is permanently fixed on a metal plate.

3. The DCM of claim 1, wherein the flame retardant encapsulant is 2-component RTV Silicone Elastomer type.

4. The DCM of claim 1, wherein the flame retardant encapsulant satisfies requirements for UL94 V-1 or better.

5. The DCM of claim 1, wherein the thickness of the encapsulant on the exposed surface of the DCF is at least approximately 0.5 mm.

6. The DCM of claim 1, wherein the flame retardant encapsulant is a liquid, semi-liquid, solid, or powder.

7. The DCM of claim 1, wherein the DCM is a dispersion slope compensating module (DSCM) and the DCF is dispersion slope compensating fiber (DSCF).

* * * * *